United States Patent [19]

Monkhouse

[11] 3,927,197

[45] Dec. 16, 1975

[54] TERTIARY ALCOHOL STABILIZED E-SERIES PROSTAGLANDINS

[75] Inventor: Donald C. Monkhouse, Waterford, Conn.

[73] Assignee: Pfizer Inc., New York, N.Y.

[22] Filed: Apr. 19, 1974

[21] Appl. No.: 462,213

[52] U.S. Cl. .......... 424/45; 260/468 D; 260/514 D; 260/557 R; 424/305; 424/317; 424/320

[51] Int. Cl.² ..................... A61K 9/12; A61K 31/19; C07C 19/74; C07C 103/37

[58] Field of Search ............. 424/305, 318, 45, 317; 260/468 D, 514 D, 557 R

[56] References Cited

UNITED STATES PATENTS

| | | | |
|---|---|---|---|
| 3,749,800 | 7/1973 | Stehle et al. | 424/318 |
| 3,833,725 | 9/1974 | Thompson | 424/243 |

*Primary Examiner*—Sam Rosen
*Attorney, Agent, or Firm*—Connolly and Hutz

[57] ABSTRACT

A stabilized pharmaceutical composition comprising an E-series prostaglandin and a saturated aliphatic tertiary alcohol having from 4 to 10 carbon atoms.

8 Claims, No Drawings

TERTIARY ALCOHOL STABILIZED E-SERIES PROSTAGLANDINS

BACKGROUND OF THE INVENTION

This invention relates to stabilized pharmaceutical compositions of prostaglandins. In particular, it relates to saturated aliphatic tertiary alcohol containing compositions of biologically active E-series prostaglandins or their analogs. The prostaglandins of the E-series are those which have at the nine position a carbonyl and at the eleven position a hydroxy.

The prostaglandins are C-20 unsaturated fatty acids which exhibit diverse physiological effects. For instance, the prostaglandins of the E-series are potent vasodilators (Bergstrom, et. al., Acta Physiol. Scand. 64:332-33, 1965 and Bergstrom, et al., Life Sci. 6:449-455, 1967) and lower systemic arterial blood pressure (vasodepression) or intravenous administration (Weeks and King, Federation Proc. 23:327, 1964, Bergstrom, et al., 1965, op. cit.; Carlson, et al., Acta Med. Scand. 183:423-430, 1968; and Carlson, et al., Acta Physiol. Scand. 75:161-169, 1969). Another well known physiological action for $PGE_1$ and $PGE_2$ is as a bronchodilator (Cuthbert, Brit. Med. J. 4:723-726, 1969). Another physiological action for $PGE_1$ is to increase nasal patency (Jackson, Curr. Ther. Res. 12:711-17, 1970).

Still another important physiological role for the natural prostaglandins is in connection with the reproductive cycle. $PGE_2$ is known to possess the ability to induce labor (Karim, et al., J. Obstet Gynaec. Brit. Cwlth. 77:200-210, 1970), to induce therapeutic abortion (Bygdeman, et al., Contraception, 4, 293 (1971) and to be useful for control of fertility (Karim, Contraception, 3, 173 (1971)). Patents have been obtained for several prostaglandins of the E-series as inducers of labor in mammals (Belgian Pat. No. 754,158 and West German Pat. No. 2,034,641). In addition, a known physiological activity of $PGF_{2\alpha}$ is synchronization of oestrus in domestic animals (Inskeep, J. Animal Sci., 36, 1149, 1973).

Still other known physiological activities for $PGE_1$ are in the inhibition of gastric acid secretion (Shaw and Ramwell, In: Worcester Symp. on Prostaglandins, New York, Wiley, 1968, p. 55-64) and also of platelet aggregation (Emmons, et al., Brit. Med. J. 2:468-472, 1967).

The application of prostaglandins in a number of areas has been severely hampered by their apparent instability, especially in solution. Karim, et al. (Eur. J. Pharmacol. 4, 416, 1968) measured the biological activity of saline solutions containing 100 ng/ml $PGE_1$, $PGE_2$ and $PGF_{2\alpha}$ stored at various pH values at room temperature. The PGE compounds showed 25-40% loss of biological activity after 60 days at pH 5-7, while the PGF compounds were still fully active after 182 days. Other prostaglandin stability studies have been carried out by Andersen (J. Lipid. Res., 10, 320, 1969), Brummer (J. Pharm. Pharmacol., 23, 804, 1971) and others and show similar results. The need for a method of storing solutions of E-series prostaglandins for long periods of time will be readily apparent.

SUMMARY OF THE INVENTION

The present invention satisfies this need by providing a stabilized pharmaceutical composition for comprising a biologically active prostaglandin of the E-series and a saturated aliphatic tertiary alcohol having from 4 to 10 carbon atoms, said prostaglandin being present in the amount of from about 0.005 to 0.500% by weight of composition. The composition is preferred in which the prostaglandin is $PGE_1$ or $PGE_2$ and especially when the $PGE_2$ is N-acetyl or N-benzoyl $PGE_2$ carboxamide of the formula:

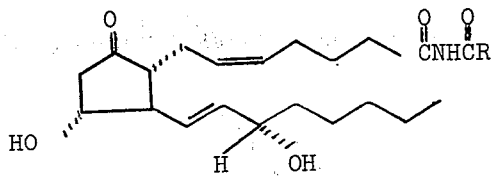

wherein: R is methyl or phenyl.

Also preferred is the composition wherein the prostaglandin is present in the amount of from about 0.010 to 0.100% by weight.

Another preferred form of the novel composition of the present invention is that in which a halogenated hydrocarbon propellant of up to 2 carbon atoms is also present, said propellant being employed in the amount of 1 to 10 parts by volume, per part of said alcohol.

DETAILED DESCRIPTION OF THE INVENTION

The synthesis of the natural prostaglandins of the E-series has been performed by Prof. E. J. Corey and his co-workers (Corey, et al., J. Amer. Chem. Soc., 92, 2586 (1970); and references cited therein), and E-series prostaglandins made by the reaction sequence as well as those made by other schemes or isolated from natural material are suitable for use in the compositions of this invention. Also suitable in the processes of this invention are 15-lower alkyl derivatives of the natural prostaglandins such as are described by G. Bundy, et al., Anal. N.Y. Acad. Sci., 180, p. 76, 1971.

The N-substituted prostaglandin carboxamides such as N-acetyl and N-benzoyl-$PGE_2$ carboxamide, described in U.S. Ser. No. 260,518 filed June 7, 1972; the tetrazoyl derivatives of prostaglandins disclosed in U.S. Ser. No. 177,102 filed Sept. 1, 1971; the oxaprostaglandins disclosed in U.S. Ser. No. 259,215 filed June 2, 1972; the p-biphenyl esters of ω-nor substituted prostaglandins such as 16-phenyl-13,14-dihydro-ω-tetranor $PGE_2$ p-biphenyl ester, described in U.S. Ser. No. 304,815 filed Nov. 8, 1972; and the ω-substituted pentanorprostaglandins such as 16-p-biphenyl-ω-tetranor $PGE_2$ and 16-(α-thienyl)-ω-tetranor $PGE_1$ disclosed in U.S. Ser. No. 271,220 filed July 13, 1972 are especially important examples of biologically active prostaglandins of the E-series useful in the compositions of the present invention. The disclosures of the above named U.S. patent applications are incorporated herein by reference.

For the first step in the preparation of the N-substituted prostaglandin carboxamides, the appropriate hemiacetal precursor is caused to react with the disodium salt of a novel N-substituted carboxamide butyltriphenylphosphonium bromide, in a molar ratio of from about 1:2 to 1:5. Such precursors are as follows:
2-[5α-hydroxy-3α-(tetrahydropyran-2-yloxy)-2β-(3α-(tetrahydropyran-2-yloxy)-trans-1-octen-1-yl)cyclopent-1α-yl]acetaldehyde, γ-hemiacetal for $PGE_1$, $PGE_2$, and 13,14-dihydro-$PGE_1$;

2-[5α-hydroxy-3α-(tetrahydropyran-2-yloxy)-2β-(3β-lower alkyl-3α-(tetrahydropyran-2-yloxy-trans-1-octen-1-yl)cyclopent-1α-yl]acetaldehyde, γ-hemiacetal for the 15-lower alkyl derivatives of these same prostaglandins;

2-[5α-hydroxy-3α-(tetrahydropyran-2-yloxy)-2β-(3α-(tetrahydropyran-2-yloxy)oct-1-yl)cyclopent-1α-yl]acetaldehyde, γ-hemiacetal for 13,14-dihydro-PGE$_2$;

2-[5α-hydroxy-3α-(tetrahydropyran-2-yloxy)-2β-(3β-lower alkyl-3α-(tetrahydropyran-2-yloxy)-oct-1-yl)cyclopent-1α-yl]acetaldehyde, γ-hemiacetal for the 15-lower alkyl derivatives of 13,14-dihydro-PGE$_2$;

and 2-[5α-hydroxy-3α-(tetrahydropyran-2-yloxy)-2β-(3α-(tetrahydropyran-2-yloxy)-cis-5-trans-1-octadien-1-yl)cyclopent-1α-yl]acetaldehyde, γ-hemiacetal for PGE$_3$.

These hemiacetal precursors are prepared by the following reaction sequences wherein PBP is p-biphenyl, THP is 2-tetrahydropyranyl, and R is lower alkyl.

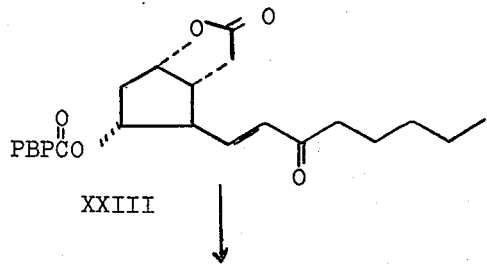

XXIII

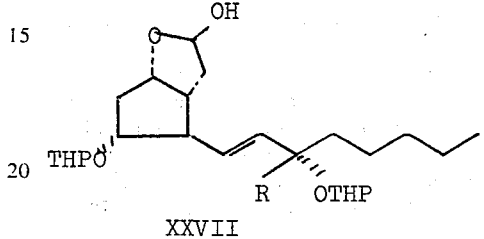

XXVII

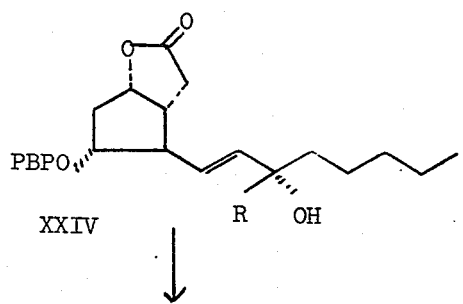

XXIV

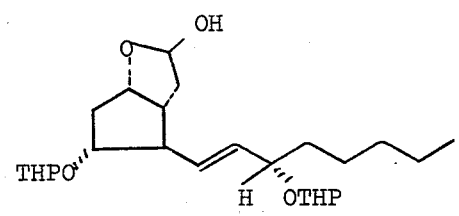

I

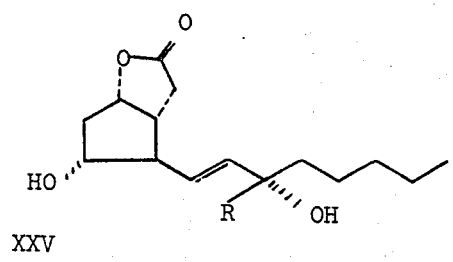

XXV

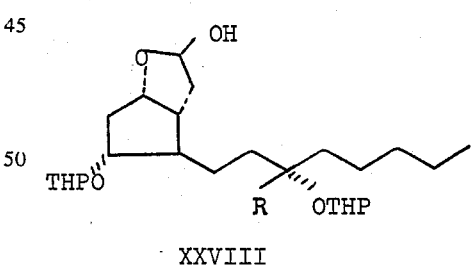

XXVIII

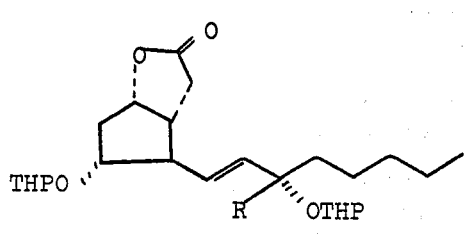

XXVI

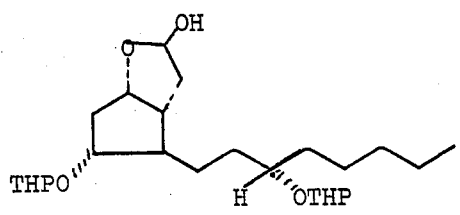

VI

Compound XXIII is a known compound and is prepared by the method of Corey et al., J.A.C.S., 93, 1491, 1971. It is treated with alkyl lithium to produce compound XXIV.

Compound XXIV → Compound XXV is a transesterification reaction brought about by treatment with $K_2CO_3$/methanol.

Compound XXV is treated with dihydropyran in the presence of an acid catalyst to produce compound XXVI.

Compound XXVI is reduced with di-iso butyl aluminum hydride to produce the unsaturated hemiacetal Compound XXVII.

Compound XXVII is reduced with $H_2/P\alpha$ to give the saturated hemiacetal XXVIII.

Alternatively, Compound XXIII can be reduced with zinc borohydride to produce compound XXIV wherein R is hydrogen. This latter compound may be carried through an analogous series of steps to produce hemiacetals I and VI.

The reaction will preferably be carried out at temperatures of about 25°–65°C. in an inert solvent such as dimethylsulfoxide and in an inert atmosphere, for a period of up to about 4 hours or until the reaction is essentially complete.

The substituted carboxamide-containing intermediates produced in the first step, as described above, may be converted by published procedures (Corey, et al., J. Am. Chem. Soc., 93, 1490 (1971) to the N-substituted carboxamide analogs of any of the prostaglandins listed above. These procedures are further described in detail in preparations $A_1$–$A_4$ below and the steps entailed are summarized in the reaction schemes A and B below, wherein R is alkanoyl, cycloalkanoyl, or alkenoyl of from 2 to 10 carbon atoms; aryoyl or substituted aryoyl from 7 to 11 carbon atoms wherein said substituents may be methyl, halogen, or methoxy; alkylsulfonyl from 1 to 7 carbon atoms; phenylsulfonyl or mono-substituted phenylsulfonyl wherein said substituent may be methyl, halogen, or methoxy; styrylsulfonyl; or 2-thiophenesulfonyl; and THP is tetrahydropyranyl.

The utility of these prostaglandins is the same as for the naturally occurring E-series prostaglandins. For example, a stabilized solution of N-acetyl or N-benzoyl $PGE_2$-carboxamide is employed as nose drops to increase nasal patency using a dosage of from about 10–500 µg/dose. For bronchodilator use, a stabilized solution of N-acetyl or N-benzoyl $PGE_2$ carboxamide is employed either as an oral spray or a pressurized Freon-containing aerosol using a dosage of from 10–500 µg/dose.

REACTION SCHEME A

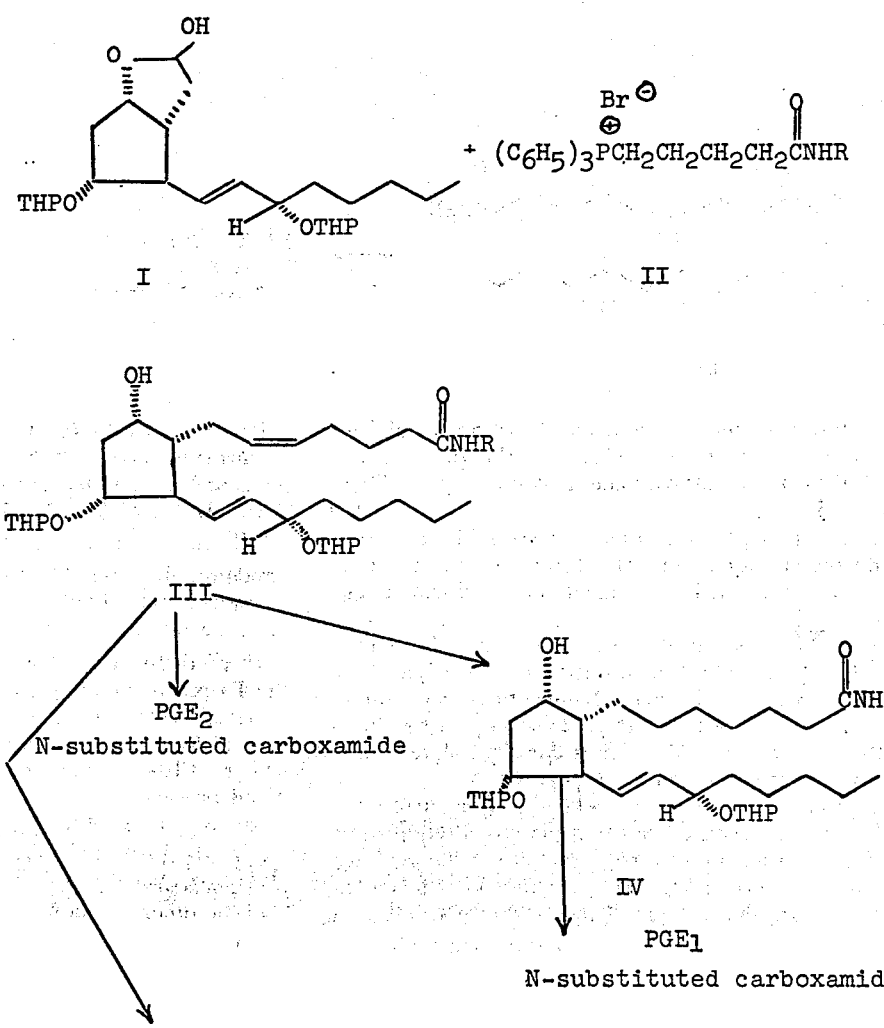

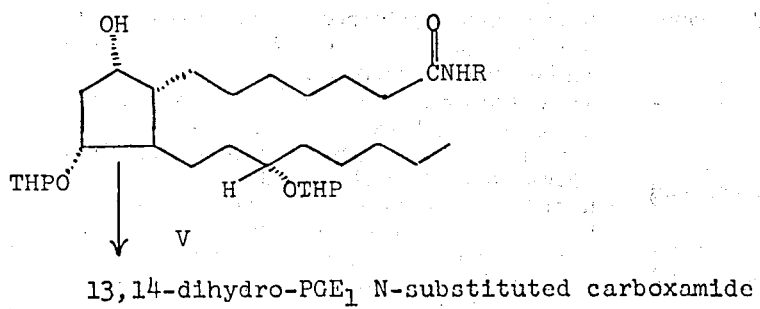

V 13,14-dihydro-PGE₁ N-substituted carboxamide

REACTION SCHEME B

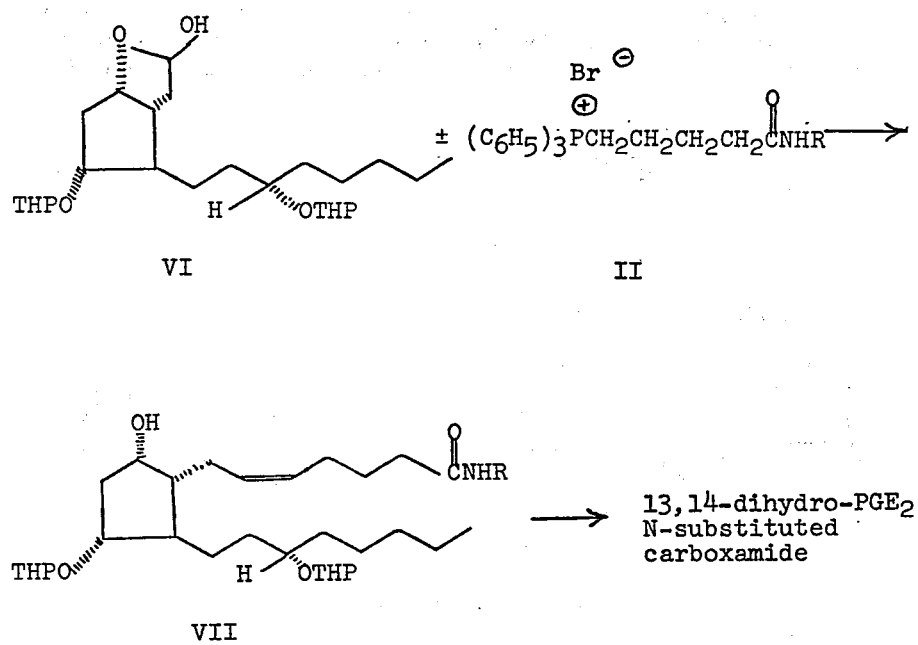

VI

± $(C_6H_5)_3\overset{\oplus}{P}CH_2CH_2CH_2CH_2\overset{O}{\overset{\|}{C}}NHR$ $Br^{\ominus}$ ⟶

II

VII ⟶ 13,14-dihydro-PGE₂ N-substituted carboxamide

As shown in Reaction Scheme A, Hemiacetal I is caused to react with the novel reagent II to produce III, the N-substituted carboxamide analog of the bis-THP ether of PGF$_{2\alpha}$.

III → PGE$_2$-N-substituted carboxamide requires treatment with Jones reagent to form a second intermediate before the acid treatment and purification as above.

III → PGE$_1$-N-substituted carboxamide follows exactly the same method as outlined for the PGE$_2$ above.

III → 13,14-dihydro PGE$_1$ N-substituted carboxamide requires a reduction with palladium on carbon and methanol to produce V which is then hydrolysed with aqueous acetic acid, and purified as above.

To produce the other 13,14-dihydro derivatives one follows the procedures outlined above. Alternatively the PGE$_2$-N-substituted carboxamides may be reduced with palladium on carbon in methanol to produce the 13,14-dihydro PGE$_1$-N-substituted carboxamide.

Referring now to Reaction Scheme B, Hemiacetal VI is caused to react with the novel reagent II to produce VII, the N-substituted carboxamide analog of the bis-THP ether of 13,14-dihydro PGF$_{2\alpha}$.

VII → 13,14-dihydro PGE$_2$-N-substituted carboxamide requires treatment with Jones reagent to form a second intermediate before acid treatment and purification as above.

To produce the 15-lower alkyl derivatives of all of the above mentioned prostaglandin N-substituted carboxamides, one merely employs a hemiacetal I or hemiacetal VI with a lower alkyl moiety in the 15 position and proceeds as above to produce the desired compound.

To produce PGE$_3$ N-substituted carboxamide, hemiacetal VIII is employed as the starting material and all of the other reaction steps are identical to those given above.

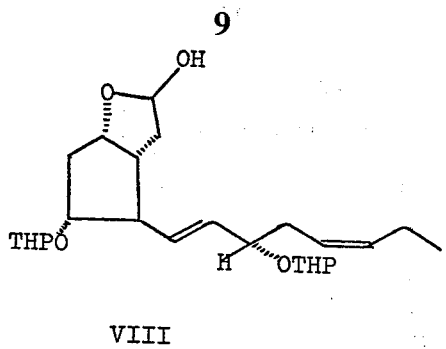

VIII

Alternatively, the N-substituted prostaglandin carboxamides may be prepared by treating the appropriate prostaglandin acid precursors with an acyl isocyanate followed by hydrolysis of the tetrahydropyranyl groups as outlined in Reaction Scheme C. The appropriate precursors X–XIV are known compounds (Corey, et al., *J. Am. Chem. Soc.*, 92, 397 (1970); ibid., 92, 2586 (1970); ibid., 93, 1490 (1971)).

For the first step in the preparation of the tetrazoyl derivatives of prostaglandins, the appropriate hemiacetal precursor (I, VI, VIII) is caused to react with the

REACTION SCHEME C

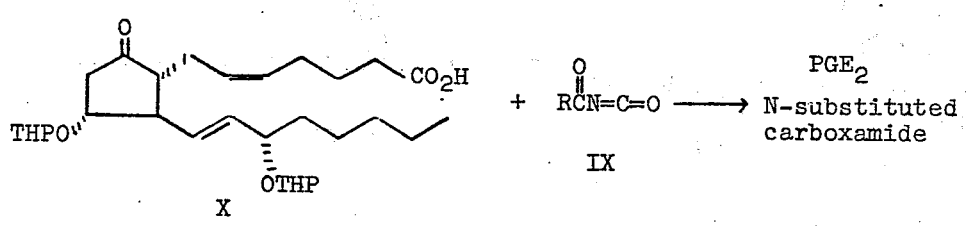

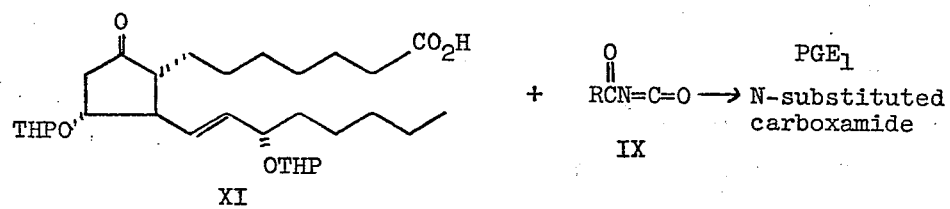

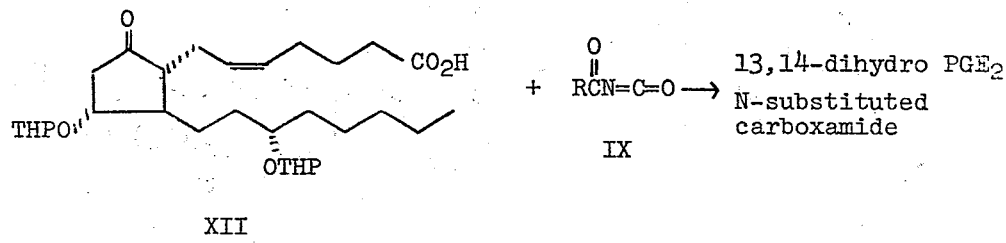

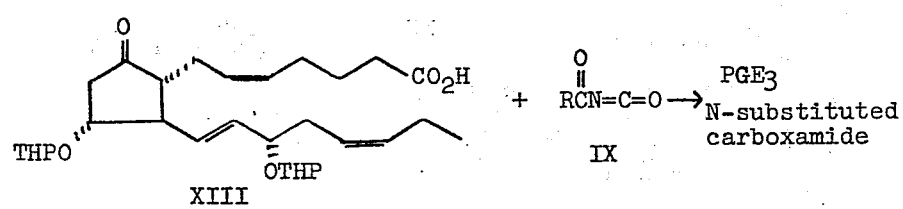

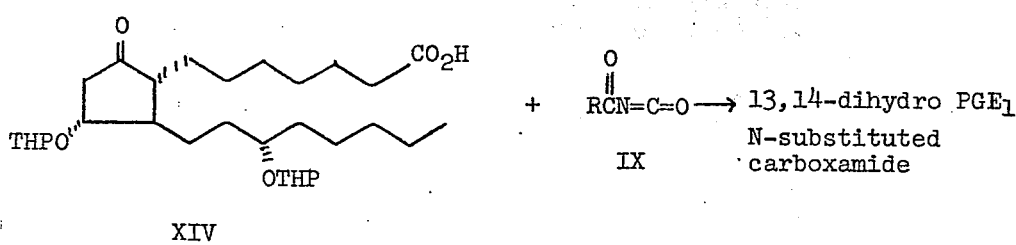

disodium salt of a novel tetrazoylbutyltriphenylphosphonium bromide (XV), in a molar ratio of from about 1:2 to 1:5. Such precursors may be converted to the tetrazoyl analogs of any of the prostaglandins listed as described above for the N-substituted carboxamide analogs.
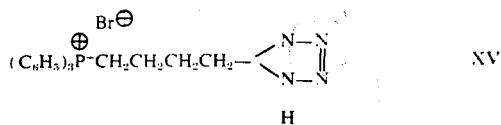
REACTION SCHEME D
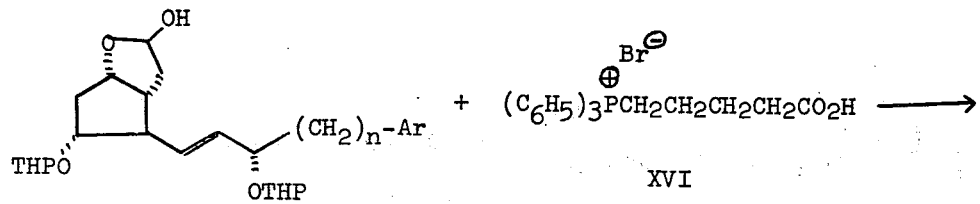
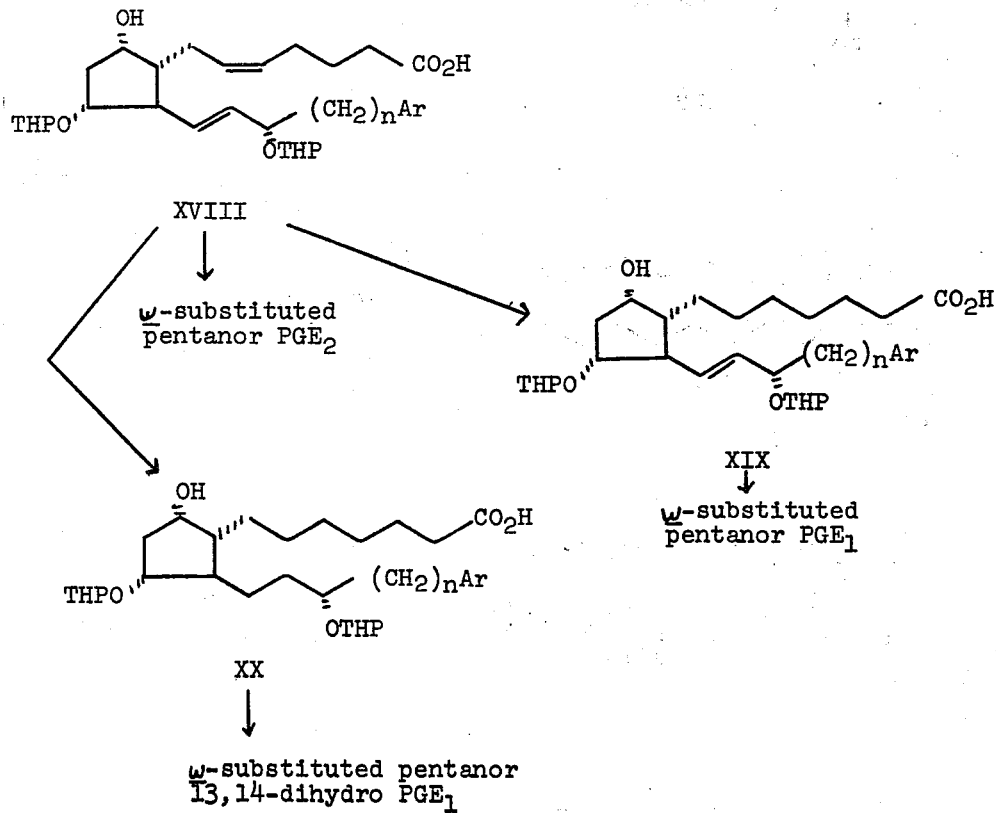

REACTION SCHEME E

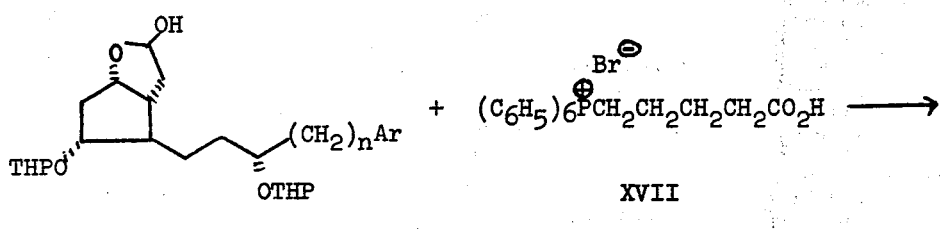

XXI

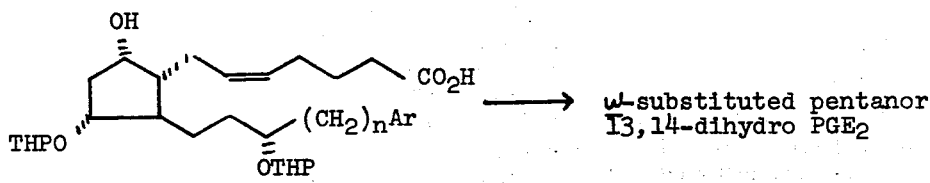

XXII

⟶ ω-substituted pentanor
13,14-dihydro PGE₂

For the first step in the preparation of the ω-substituted pentanor prostaglandins, the appropriate hemiacetal precursors (XVII and XXI wherein Ar is α- or β-furyl, α- or β-thienyl, α- or β-naphthyl, 3,4-dimethoxyphenyl, 3,4-methylenedioxyphenyl, 3,4,5-trimethoxyphenyl, phenyl, or mono-substituted phenyl wherein said substituent is halo, trifluoromethyl, phenyl, lower alkyl, or lower alkoxy, and $n$ is 1 or 2) is caused to react with the disodium salt of the known carboxybutyltriphenylphosphonium bromide (XVI), in a molar ratio of from 1:2 to 1:5. The products of this reaction (XVIII and XXII) may be converted to the ω-substituted pentanor prostaglandins as outlined in Reaction Schemes D and E and described above for the N-substituted carboxamide analogs.

Treatment of the appropriate ω-substituted pentanor PGE analog with a substituted carbodiimide, for example dicyclohexylcarbodiimide, and p-phenylphenol in a molar ratio of 1:1:10 in a solvent such as methylene chloride or chloroform provides after column chromatographic purification the desired p-biphenyl esters of ω-substituted pentanor PGE analogs.

The alcohols suitable for use in the composition of the present invention are numerous; they are all characterized as saturated, aliphatic, tertiary alcohols having from 4 to 10 carbon atoms. Such alcohols include, among others, t-butanol; 2,3-dimethyl-2-butanol; 3-methyl-2-butanol; 2,3-dimethyl-3-pentanol; and 3-ethyl-3-pentanol. Because of low cost and availability, t-butanol is preferred in the process of this invention.

In some cases, the compositions of the present invention are desirably administered by aerosol spray. For such application, a halogenated hydrocarbon propellant of up to 2 carbon atoms is employed. The propellant may be any of the conventional propellants used in aerosol formulations, for example halogenated hydrocarbons of the fluorohydrocarbon or fluorohalohydrocarbon type such as trichloromonofluoromethane, dichlordifluoromethane, dichlortetrafluoroethane, monochlorotrifluoromethane, monochlorodifluoromethane and mixtures of any of these together or with other propellants. Typical of suitable propellants are those disclosed in, for example, U.S. Pat. No. 2,868,691 and sold under the trademark Freon.

The examples to follow are illustrative and in no way limit the scope of the appended claims.

EXAMPLES I–XIV

By use of pharmaceutical compositions of this invention, the bronchodilator activity of the prostaglandin can be successfully retained for long periods of time at elevated temperatures. This is especially important for use in aerosol bronchodilator formulations.

The Table below demonstrates the effectiveness of t-butanol containing preparations of prostaglandin E in retaining potency for protecting guinea pigs against histamine-induced bronchospasms after storage at elevated temperatures. The stability of E-series prostaglandins used in increasing nasal patency, induction of labor, induction of abortion, and fertility control will be equally enhanced by the compositions of this invention.

| Example | Prostaglandin (wt in mg) | Weight Ratio PGE:t-butanol:Freon | Conditions[1] | % Protection |
|---|---|---|---|---|
| I | 1.6 mg $PGE_2$ | 1:35:8500 | 2 weeks/ 0°C. | 72 |
| II | 1.6 mg $PGE_2$ | 1:35:8500 | | 62 |
| III | 1.6 mg $PGE_2$ | 1:55:8500 | | 70 |
| IV | 1.6 mg $PGE_2$ | 1:60:8500 | 2 weeks/50°C. | 83 |
| V | 1.6 mg. $PGE_2$ | 1:500:7600 | | 79 |
| VI | 1.6 mg $PGE_2$ | 1:950:6700 | | 76 |
| VII | 1.5 mg $PGE_2$ | 1:260:8500 | | 50 |
| VIII | 1.5 mg $PGE_2$ | 1:520:8500 | | 71 |
| IX | 1.5 mg $PGE_2$-imide[3] | 1:260:8500 | 12 weeks 50°C. | 75 |
| X | 1.5 mg $PGE_2$-imide[3] | 1:520:8500 | | 75 |
| XI | 3 mg $PGE_2$ | 1:25:1400 | 12 weeks/50°C. | 79 |
| XII | 3 mg $PGE_2$ | 1:100:1200 | | 75 |
| XIII | 3 mg $PGE_2$ | 1:390:800 | | 79 |
| XIV | Control fresh $PGE_2$-imide[3] | | | 64 |
| XV | 1.5 mg $PGE_2$[4] | 1:2150:5600 | | 0 |
| XVI | 1.5 mg $PGE_2$-imide[4] | 1:2150:5600 | 2 weeks/60°C | 0 |

[1] Sealed in ampules.
[2] Stock solutions diluted to 56-100 mcg./ml. with ethanol or water. These diluted solutions were nebulized into a perspec box and the guinea pigs were exposed to the direct spray for one minute with an additional minute allowed for inhalation. The guinea pig was then placed into another box into which a histamine solution (2 mg./ml.) had been sprayed for one minute. A subjective evaluation of the breathing pattern in the pig was made after 60 to 75 seconds in this atmosphere (0 = no effect, 4 = convulsions).

$$\% \text{ Protection} = \frac{(\Sigma \text{ Control Evaluation} - \Sigma \text{ Experimental Evaluation})}{\Sigma \text{ Control Evaluation}} \times 1$$

[3] N-acetylprostaglandin $E_2$ carboxamide
[4] These samples formulated with ethanol in place of t-butanol.

EXAMPLE XV

$PGE_2$ for Infusion 25 mg. $PGE_2$ is placed in each of a series of vials. To each vial is added one ml. t-butanol alcohol. The solutions may be diluted with 0.9% saline solution for infusion.

EXAMPLE XVI

N-Benzoyl-Prostaglandin $E_2$-Carboxamide for Aerosol

| | |
|---|---|
| N-benzoyl-Prostaglandin $E_2$-carboxamide | 10 mg. |
| t-butyl alcohol | 2 g. |
| Freon 115/Freon 114 (40/60 w/w) | to 10 g. |

The prostaglandin is dissolved in t-butyl alcohol and subdivided into plastic coated aerosol bottles. The Freon is then cold-filled into the containers which are sealed with a suitable metered valve.

What is claimed is:

1. A stabilized pharmaceutical composition comprising a biologically active prostaglandin of the E-series and a saturated aliphatic tertiary alcohol having from 4 to 10 carbon atoms, said prostaglandin being present in the amount of from about 0.005 to 0.500% by weight.

2. The composition of claim 1 wherein said prostaglandin is present in the amount of from about 0.010 to 0.100% by weight.

3. The composition of claim 1 wherein said prostaglandin is $PGE_1$ or $PGE_2$.

4. The composition of claim 1 wherein said prostaglandin is a $PGE_2$ carboxamide of the formula:

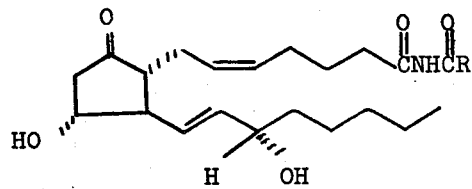

wherein R is methyl or phenyl.

5. The composition of claim 4 wherein R is methyl.
6. The composition of claim 4 wherein R is phenyl.
7. The composition of claim 1 wherein said alcohol is t-butyl alcohol.
8. The composition of claim 1 also containing from about 1 to 10 parts by volume, based on said alcohol, of a halogenated hydrocarbon propellant of up to 2 carbon atoms.

* * * * *